United States Patent Office 3,703,565
Patented Nov. 21, 1972

3,703,565
BLENDS OF ETHYLENE POLYMERS HAVING IMPROVED STRESS CRACK RESISTANCE
Louis D. Hoblit, Williamsburg, Va., and Carl P. Strange, Baton Rouge, La., assignors to The Dow Chemical Company, Midland, Mich.
No Drawing. Continuation-in-part of application Ser. No. 755,831, Aug. 28, 1968, now Patent No. 3,660,530, dated May 2, 1972, which is a continuation-in-part of abandoned application Ser. No. 514,119, Dec. 15, 1965. This application Feb. 22, 1971, Ser. No. 117,819
The portion of the term of the patent subsequent to May 2, 1989, has been disclaimed
Int. Cl. C08f 29/04, 29/10
U.S. Cl. 260—876 B                4 Claims

ABSTRACT OF THE DISCLOSURE

Blends of ethylene polymers having improved stress crack resistance comprising a high density, high molecular weight polyethylene and a copolymeric constituent containing as an essential ingredient at least one block copolymer of polyethylene and a polymer of butene-1. A method for the preparation thereof which comprises (1) polymerizing ethylene to high density, high molecular weight polyethylene in the presence of a heterogeneous catalyst system, such as a mixture of triisobutyl aluminum and titanium tetrachloride, and a molecular weight control agent, such as hydrogen; (2) withdrawing a major part of the resulting polymer slurry from the polymerization zone; (3) introducing a gaseous alpha-olefin, such as butene-1, into the remaining portion of the still catalytically active polymer slurry and polymerizing the resulting mixture to obtain a block copolymer of polyethylene and a polymer of butene-1; and (4) admixing the withdrawn polymer slurry with the remaining polymer slurry.

CROSS REFERENCES TO RELATED APPLICATIONS

This is a continuation-in-part of Ser. No. 755,831 filed in Aug. 28, 1968, now U.S. Pat. No. 3,660,530, granted May 2, 1972, which is a continuation-in-part of Ser. No. 514,119 filed in Dec. 15, 1965, now abandoned.

BACKGROUND OF THE INVENTION

This invention relates to ethylene polymers and articles fabricated therefrom. More particularly, the invention relates to articles fabricated from ethylene polymers having improved resistance to environmental stress cracking. Ethylene polymers which are otherwise desirable for the manufacture of articles of relatively light weight, having excellent flexibility over a wide range of temperatures and exhibiting chemical inertness toward aqueous and non-aqueous liquids, have been found deficient in several properties among which is that articles manufactured therefrom are susceptible to environmental stress cracking; that is, articles fabricated from ethylene polymers have a tendency to crack and rupture when subjected to stress in the presence of certain environments.

Articles manufactured from ethylene polymers normally contain internal strains which are produced in the article during the forming operation as, for example, the molding or extrusion operation and also during any subsequent operation on the fabricated articles, such as a stretching or machining operation. These internal strains in themselves are often sufficient to cause the fabricated article to crack and rupture without being subjected to external stress. Generally, however, cracking and rupturing most often occur when the fabricated polymer is subjected to a stress, for example, a bending or other such deformation in the presence of certain environments. As an illustration, cracking and rupturing of articles manufactured from ethylene polymers have been found to occur in those applications wherein the fabricated article is subjected to a stress in the presence of surface active agents, such as soaps and detergents, also in the presence of alcohols, polyglycol ethers, silicon fluids and various aliphatic and aromatic hydrocarbons. For example, the packaging industry has reported the failure of polyethylene containers as the packaging means for surface active agents due to environmental stress cracking.

Stress cracking is particularly undesirable as it severely shortens the useful life of the ethylene polymer article. An article once cracked and ruptured is, for all practical purposes, rendered useless.

In view of the problems arising in the prior art in preparing ethylene polymers which, when fabricated, exhibit good tensile strength and stress crack resistance, ethylene polymers or blends thereof having said properties and a method for preparing them would be highly desirable.

SUMMARY OF THE INVENTION

Accordingly in the present invention blends of ethylene polymers having the above-mentioned desirable properties and a novel method for the preparation thereof are provided. The novel polymeric blends of this invention, hereinafter described in greater detail, comprise (1) from about 40 to about 95 weight percent of a high density, high molecular weight polyethylene and (2) from about 5 to about 60 weight percent of a copolymeric constituent containing as an essential ingredient a block copolymer of (a) polyethylene and (b) a polymer of butene-1. These novel blends are preferably prepared by a process which comprises the steps of (a) polymerizing ethylene in a low pressure polymerization zone in the presence of a molecular weight control agent and a heterogeneous catalyst in an inert diluent until the resulting polymer slurry contains from about 5 to about 40 weight percent high density, high molecular weight polyethylene polymer solids; (b) withdrawning a major portion of the resulting polymer slurry from the polymerization zone; (c) introducing butene-1 into the remainder of the still catalytically active polymer slurry and polymerizing the butene-1 in the remainder of the polymer slurry until the amount of butene-1 polymerized ranges up to about 5 weight percent of the total amount of ethylene polymerized in step (a) and thereby obtaining a polymer slurry comprising a block copolymer of polyethylene and polymerized butene-1; (d) admixing the polymer slurry produced in step (a) with the polymer slurry produced in step (c); and (e) recovering the resulting polymer blend. By the term "heterogeneous catalyst" is meant a catalyst system resulting from the admixing of at least two components, one of which is an organometallic compound and another of which is a transition metal compound such as a transition metal halide, oxyhalide, or complex halide. The polymeric blends of this invention are especially useful in the polymer coating art, for example, wood finishes, floor waxes, and other protective coatings for wood, plastic, glass, and metal substrates. Said blends may also be utilized in fabricating shaped articles such as bottles and other kinds of containers.

DESCRIPTION OF THE PREFERRED EMBODIMENTS

The novel blends of this invention require a high density, high molecular weight polyethylene as a major component and as a minor component a copolymeric constituent containing as an essential ingredient a block copolymer of polyethylene and a polymer of butene-1.

The high density, high molecular weight polyethylene component has a density in the range of from about 0.94 to about 0.98 and a melt index, as determined by ASTM D–1238–62T(E), in the range of from about 0.1 decigram/minute to about 12 decigrams/minute, preferably from about 0.8 to about 4.5 decigrams/minute. Polyethylenes suitable for use in this invention are prepared by polymerizing ethylene under conditions normally used in a heterogeneous catalyst system, e.g., as described in U.S. Pats. 3,113,115 and 3,257,332 of Karl Ziegler et al.

The coplymeric constituent used as the minor component of the invention has a density in the range from about 0.90 to about 0.96 and a melt flow viscosity, as determined by ASTM D–1238–62T(E), in the range from about $1 \times 10^{-9}$ decigram/minute to about 1 decigram/minute. Butene-1 may be present in the copolymeric constituent in concentrations from about 0.05 up to about 40 weight percent based on the constituent, with preferred concentrations being from about 0.25 to about 10 weight percent. Correspondingly, ethylene is present in the copolymeric constituent in concentrations from about 60 to about 99.95 weight percent, preferably in concentrations from about 90 to about 99.75 weight percent. The co-constituent containing as an essential ingredient a block polymeric constituent has an essential ingredient; a block copolymer of polyethylene and a polymer of butene-1. copolymer) includes the homopolymers of butene-1 and the copolymers of butene-1 and other alpha-olefins, e.g. ethylene, propylene, hexene-1 and the like. Examples of block copolymers suitably employed as the essential ingredient of the copolymeric constituent include the block copolymers of polyethylene and poly(butene-1), polyethylene and ethylene/butene-1 copolymer, and the like.

In addition to the block copolymer, the copolymeric constituent optionally contains other polymers such as poly(butene-1), ethylene/butene-1 random copolymers and other alpha-olefin polymers. Additional small amounts, i.e., up to about 3 weight percent based on the copolymeric constituent, of other polymers may also be present. Such polymers are the polymers of the monovinylidene aromatic compounds, e.g., styrene; the diolefins, e.g., 1,3-butadiene; and other monomers which can be polymerized in heterogeneous catalyst systems.

In one embodiment the copolymeric constituent contains as a first and essential ingredient a block copolymer of polyethylene and an ethylene/butene-1 copolymer and, as a second ingredient, an ethylene/butene-1 random copolymer. The copolymeric costituent of this embodiment may be prepared by a method comprising the steps of (1) polymerizing ethylene in the presence of a molecular weight control agent and a heterogeneous catalyst; (2) introducing butene-1 and ethylene into the resulting polymer slurry; and (3) subjecting the resulting mixture of polyethylene, ethylene and butene-1 to polymerizing conditions whereby ethylene/butene-1 copolymer block segments are formed on the pre-formed polyethylene block segments and a block copolymer is thereby obtained. Other copolymeric constituents are suitably prepared in a similar manner.

Other components which may be included in the polymeric blends of this invention in concentrations less than 10 weight percent based on the total blend include substances such as carbon black; antioxidants, e.g., 4,4'-thiobis-(6-tert-butyl-m-cresol), 2,6-di-tert-butyl - 4 - methyl- phenol; color concentrates; various polymeric materials and the like.

The novel polymeric blends of this invention have densities ranging from about 0.93 to about 0.975 and melt flow viscosities, as determined by ASTM D–1238–62T(E), in the range of from about 0.05 decigram/minute to about 10 decigram/minute. The major component, high density, high molecular weight polyethylene, is present in the polymeric blend in concentrations ranging from about 40 weight percent to about 95 weight percent based on the blend with the preferred concentrations being from about 60 to about 80 weight percent. The minor component, the copolymeric constituent, is present in the blend in amounts from about 5 to about 60 weight percent based on the total blend, preferably from about 20 to about 40 weight percent. It is desirable that the concentration of polymerized butene-1 in the polymeric blend be kept at or below about 5 weight percent, preferably within the range of from about 0.2 to about 1.2 weight percent, calculated as butene-1 based on the total polymeric blend. Polymeric blends having more than 5 weight percent of polymerized butene-1 on this basis do not usually exhibit any improvement over the properties of the blends containing less than 5 weight percent of polymerized butene-1.

While it is possible to prepare the blends of this invention by mechanically mixing the required components in a dry state, these novel blends are preferably prepared by a novel two stage process wherein a suitable polyethylene product is prepared in the first stage, a suitable copolymeric product is prepared in the second stage, and the resulting products (each in the form of a polymer slurry) of the two stages are finally admixed.

Ethylene may be polymerized in accordance with the low pressure process of the present invention in a polymerization zone in the presence of a heterogeneous catalyst, a so-called Ziegler-type catalyst, obtained by mixing an alkyl aluminum or another compound selected from the group consisting of a metal, an alloy, a metal hydride and an organo-metallic compound of the Groups I, II, and III of the Periodic Chart with a reducible compound of a metal of Groups IV–A, V–A, VI–A, and VIII of the Periodic Chart.

For the purposes of illustration the alkyl aluminum component of the catalyst mixture can be represented by the general formula

wherein R is alkyl, preferably containing from 1 to 12 carbon atoms; Y is selected from the group consisting of alkyl, preferably from 1 to 12 carbon atoms, and hydrogen; and Y' is selected from the group consisting of alkyl, preferably from 1 to 12 carbon atoms, hydrogen, and halogen such as chlorine, with the proviso that when Y' is halogen Y is alkyl.

Examples of compounds corresponding to the aforementioned formula which can be used include trimethyl aluminum, triethyl aluminum, triisobutyl aluminum, tri-n-butyl aluminum, tri-n-pentyl aluminum, triisooctyl aluminum, tri-n-dodecyl aluminum, diethyl aluminum chloride, diethyl aluminum hydride and the like. Other compounds which are likewise suitable include butyl lithium, amyl sodium, phenyl sodium, dimethylmagnesium, diethylmagnesium, diethylzinc, butylmagnesium chloride and phenylmagnesium bromide.

Metals included in Groups IV–A, V–A, VI–A and VIII of the Periodic Table are titanium, zirconium, hafnium, thorium, uranium, vanadium, columbium, tantalum, chromium, molybdenum, tungsten and iron. Examples of compounds of these metals which may be used as catalyst components include halides, such as chlorides or bromides, oxy halides such as oxychlorides, complex halides such as complex fluorides, freshly precipitated oxides or hydroxides, and organic compounds such as alcoholates, acetates, benzoates or acetyl acetonates. The preferred compounds are those of titanium, zirconium, thorium, uranium and chromium. Titanium compounds are particularly preferred, for example, titanium tetrachloride, titanium oxychloride or titanium acetyl acetonate; titanium tetrachloride is especially preferred.

A particularly suitable heterogeneous catalyst system which may be employed in the process of the present invention is one made from triisobutyl aluminum and titanium tetrachloride.

The catalyst is desirably prepared in an atmosphere free of moisture and oxygen, such as in a gas atmosphere of nitrogen, argon, helium and the like. In one method, the polymerization catalyst is prepared by dissolving each of the catalyst components in an inert liquid vehicle such as hexane, pentane and the like. The solutions of the catalyst components are then added to each other forming a slurry which is stirred for about 1 minute to 48 hours. Stirring times are not critical, and the shorter stirring times are preferred. After mixing, the resultant catalyst slurry is then introduced into the polymerization zone.

The molar ratio of alkyl aluminum compound to reducible metal compound used in preparing the catalyst ranges from about 0.1:1 to about 10:1 and preferably about 0.8:1 to about 1.2:1.

The concentration of catalyst in the polymerization zone is usually in the range of 0.2 to 5 millimoles per liter of inert polymerization vehicle charged to that zone.

The polymerization reaction is carried out with the so prepared catalyst dispersed throughout an inert liquid vehicle and the ethylene or butene-1 gas can be bubbled through the liquid vehicle which contains the catalyst reaction product. Examples of the preferred liquid vehicles are aliphatic, cycloaliphatic, and hydrogenated aromatic hydrocarbons, such as pentane, hexane, cyclohexane, heptane, tetrahydronaphthalene, decahydronaphthalene, the higher paraffins, and mixtures thereof. Aromatic hydrocarbons such as benzene, xylene, and mixtures thereof may also be used.

The polymerization reaction to prepare the ethylene polymer is conducted at temperatures in the range from about 30° to about 100° C. and preferably from about 85° to about 95° C.

It is unnecessary to employ elevated pressures in the polymerization zone in order to bring about the polymerization according to the present invention. However, for convenience of handling gaseous olefins, such as ethylene and butene, it is sometimes advantageous to employ slightly elevated pressures. Most suitably the polymerization zones are maintained under a pressure between atmospheric and about 115 pounds per square inch gauge (p.s.i.g.). Preferably the polymerization of ethylene is carried out at a pressure range of 55 to 65 p.s.i.g.

Suitable molecular weight control agents include hydrogen, acetylene and other commonly employed chain transfer agents, such as carbon tetrachloride, chloroform and the like in concentrations which are necessary to yield polyethylene having the required melt index and which are readily calculated by those skilled in the art. Required concentrations vary with the particular chain transfer agent as each has a different chain terminating efficiency. For the purposes of illustration, when hydrogen is used as the molecular weight control agent, the amount of hydrogen employed ranges from about 1 to about 90 mole percent based on the ethylene feed, and preferably about 25 to about 50 mole percent. The type and concentration of molecular weight control agents are essentially the only control of molecular weight in the systems utilized in this invention.

The ethylene is polymerized in the polymerization zone until the solids content of the resulting polymer slurry reaches about 5 to about 40 percent by weight and preferably about 25 to about 30 percent by weight. At these solids concentrations the components are in a fluid-like state and can be readily mixed together with the polymer slurry prepared in the second stage of the process. Thereafter a major portion of the polymer slurry, e.g., about 60 to about 80 percent by weight, is withdrawn from the polymerization reactor, said major portion may be held over in active state for mixing with minor portion or it may be passed to a digestion zone maintained at about 80° C. to about 90° C.

The remaining portion, when processed in a continuous manner, is passed to a second polymerization reactor where butene-1 or a mixture of butene-1 and another α-olefin, preferably ethylene, is introduced into the polymer slurry. In a batchwise process the butene-1 or the mixture of butene-1 and another α-olefin is introduced directly into the original polymerization reactor containing the remaining portion. In either case there is effectively complete absence of hydrogen or any molecular weight control agent other than the 1-butene or another α-olefin.

As in the case of the preparation of the catalyst, all the polymerization reactions are preferably carried out in the absence of molecular oxygen, carbon monoxide, carbon dioxide and water. The catalyst effectiveness is destroyed by reaction with oxygen, carbon monoxide, carbon dioxide, or water; and consequently, if any of these are present in excess, no polymerization will take place.

The polymerization of butene-1 or of butene-1 and ethylene in the polyethylene slurry in the second stage is conducted under conditions substantially equivalent to those employed in the polymerization of ethylene, i.e., at about 30° to about 100° C. and a pressure of about 10 to about 200 p.s.i.g.

The polymerization of butene-1 is continued until the amount of butene-1 polymerized ranges up to about 5 percent by weight of the total amount of ethylene originally polymerized. If ethylene is introduced in addition to butene-1, the amount of newly introduced ethylene polymerized ranges from about 0.05 to about 15 percent by weight of the total amount of ethylene polymerized in the first stage. Preferably the amount of butene-1 polymerized ranges from about 0.2 to about 1.2 percent of the total amount of ethylene polymerized in the first stage.

Upon completion of the polymerization of butene-1, any excess monomer is vented and the contents of the reactor are passed to the digestion zone wherein the polymerization mixture is admixed with the major portion of the polyethylene slurry. The admixture is then treated by any suitable method to inactivate the catalyst and remove the catalyst residues and recover the polymer mixture. In one method, inactivation of the catalyst is accomplished by washing with an alcohol such as methanol, n-propanol, isopropanol, water or other suitable material. The point at which the catalyst is deactivated is not critical; thus the slurries from either stage may be deactivated at any time after polymerization is completed, i.e., before or after the admixing step. The polymer is then separated from the diluent, e.g., by decantation, filtration, or other suitable method, after which the polymer is dried.

The practice of this invention is best illustrated by the following examples. The techniques and conditions normally used in heterogeneous catalyst systems are suitable for the practice of this invention. These examples are given merely by way of illustration and are not intended to limit the scope of the invention in any way nor the manner in which the invention can be practiced.

EXAMPLE 1

Runs identified as Nos. 1 through 4 were conducted in accordance with the process of the present invention by the following procedure.

Seven milliliters of a 1 molar n-hexane solution of triisobutyl aluminum was added to 7 milliliters of a 1 molar n-hexane solution of titanium tetrachloride. The catalyst components were stirred 30 minutes at ambient temperatures in an atmosphere of dry, oxygen-free nitrogen, forming a slurry of solid catalyst in the hexane. The catalyst slurry was then introduced by nitrogen pressure into a stirred reactor which had been previously kept under nitrogen pressure, containing two liters of dry, oxygen-free n-hexane.

A mixture of hydrogen and ethylene gas was passed into the bottom of the reactor at a pressure of 60 p.s.i.g. and a temperature of 88° to 90° C. The amount of hydrogen was 50 mole percent based on the ethylene feed. When the polymer solids in the resulting polyethylene slurry reached about 30 percent by weight, approximately 3 of 4 total parts of the polymer slurry was transferred directly into a digestor containing isopropyl alcohol. The remaining 1 part of live polymer slurry was transferred to a second reactor wherein butene-1 was introduced into the polymer slurry. The polymerization of butene-1 to form a block copolymer of polyethylene and poly(butene-1) was conducted at 45° to 55° C. and 40 p.s.i.g. pressure. No hydrogen was introduced into the second reactor. In different runs the amount of butene-1 polymerized was varied from 0.2 percent by weight based on the amount of ethylene polymerized in the first reactor to 1.2 percent by weight. After the required amount of butene-1 was polymerized the slurry of the block copolymer was passed to the digestor containing the 3 parts of the polyethylene slurry from the first reactor. The polymer slurries were admixed and the catalyst was solubilized by heating the slurry at 85° C. for 60 minutes. The combined slurry was then cooled to 40° C., removed from the digestor and the vehicle and polymer separated by centrifugation. The recovered polymer was dried at 100° C. under reduced pressure in a nitrogen atmosphere.

Portions of the polymer compositions were molded and cut into test tabs (⅛″ thick x ½″ wide x 1½″ long) at a cylinder temperature of 430° F. using a one ounce Watson Stillman Molding Machine. The resistance of test tabs of the polymer composition to stress cracking was determined according to ASTM D-1693-59T using a condensate of p-nonylphenol and 9 moles of ethylene oxide. Stress crack resistance is represented by the symbol $F_{50}$ and is reported as the time in hours at which 50 percent of the samples failed according to the ASTM test.

The stress crack resistance of the molded polymer samples as well as their physical properties are summarized in Table I below.

For purposes of contrast the above runs were repeated with the exception that instead of polymerizing butene-1 with a portion of the polymer slurry in the absence of hydrogen, butene-1 was added during the polymerization of the ethylene in the presence of hydrogen. The properties of the molded polymer compositions prepared by these control runs, designated sample numbers $C_1$, $C_2$, and $C_3$, are also summarized in Table I below.

TABLE I

| Sample Number | Polymer properties | | | | | |
|---|---|---|---|---|---|---|
| | Percent polymerized butene-1 in polymer | Melt index,[1] decig./min. | Approximate tensile[2] modulus (p.s.i.) | Density,[3] (g./cc.) | Percent[4] crystallinity | $F_{50}$ |
| 1 | 0.2 | 0.6 | 138,000 | 0.97 | 83 | 48 |
| 2 | 0.2 | 0.4 | 138,000 | 0.9630 | 83 | 93 |
| 3 | 0.7 | 0.1 | 138,000 | [5]ND | 82 | 500 |
| 4 | 1.2 | 0.05 | 138,000 | 0.9609 | 84 | 500 |
| $C_1$ | 0.5 | 0.6 | 138,000 | [5]ND | 85 | 24 |
| $C_2$ | 0.7 | 0.4 | 138,000 | [5]ND | 85 | 41 |
| $C_3$ | 1.2 | 0.1 | 138,000 | 0.9662 | 87 | 120 |

[1] Melt Index is by ASTM D-1238-62T(E).
[2] Tensile modulus is by ASTM D-638-61T.
[3] Density is by ASTM D-1505-60T.
[4] Percent crystallinity is by the Aggarwal and Tilley Method.
[5] "ND" means not determined.

EXAMPLE 2

The procedure used in Runs 1 through 4 of Example 1 was repeated to prepare polyethylene containing varying amounts of polymerized butene-1 identified as products Nos. 5 through 8 except that ethylene was also introduced into the second stage reactor. These compositions were then blow molded into ½ gallon bleach bottles by conventional blow molding techniques. The bottles prepared from the resulting polymer compositions, which are essentially blends of polyethylene and a block copolymer of polyethylene and ethylene/butene-1 copolymer, were then subjected to a modified stress crack resistance test of the exterior body. In this modified test, simulating actual field use, the interior of the blow molded bottle was subjected to a constant pressure of 6 p.s.i.g. while under a stress deflection of 3 percent. The bottle heel was placed in a 1 percent commercial household detergent solution and the test conducted in an oven at 60° C. Stress crack ($F_{50}$) is the time in hours required for half of the bottles on test to crack. The stress crack resistance of these bottles is summarized in Table II below.

For purposes of contrast, similar bottles were blow molded from polymer compositions prepared in a similar manner to the above with the exception that the polymer compositions were prepared by polymerizing butene-1 in the first stage in the presence of ethylene and molecular hydrogen. The stress crack resistance of these control bottles, designated sample numbers $C_4$, $C_5$, $C_6$ and $C_7$, are also summarized in Table II below.

TABLE II.—PROPERTIES OF POLYMER COMPOSITION FROM WHICH BOTTLES WERE BLOW MOLDED

| Sample Number | Percent polymerized ethylene in the second stage | Percent polymerized butene-1 in polymer | Melt index | Approximate tensile modulus | Density | $F_{50}$ hours |
|---|---|---|---|---|---|---|
| 5 | 5.0 | 0.1 | 0.7 | 140,000 | 0.964 | 65 |
| 6 | 5.0 | 0.2 | 0.7 | 140,000 | 0.964 | 60 |
| 7 | 5.0 | 0.3 | 0.7 | 140,000 | 0.964 | 60 |
| 8 | 5.0 | 0.5 | 0.7 | 140,000 | 0.964 | 55 |
| $C_4$ | 5.0 | 0.1 | 0.6 | 140,000 | 0.964 | 35 |
| $C_5$ | 5.0 | 0.3 | 0.3 | 140,000 | 0.964 | 25 |
| $C_6$ | 5.0 | 0.5 | 0.6 | 140,000 | 0.964 | 25 |
| $C_7$ | 5.0 | 1.9 | 0.6 | 140,000 | 0.964 | 25 |

What is claimed is:

1. A composition of matter having improved stress crack resistance, said composition being a polymeric blend having a density from about 0.93 to about 0.975 and a melt flow viscosity from about 0.05 to about 10 decigrams per minute, said blend comprising (1) from about 40 weight percent to about 95 weight percent of a high density, high molecular weight polyethylene having a density in the range of from about 0.94 to about 0.98 and a melt index in the range of from about 0.1 decigram per minute to about 12 decigrams per minute and (2) from about 5 weight percent to about 60 weight percent of a high molecular weight copolymeric constituent containing as an essential ingredient a block copolymer of (a) polyethylene and (b) a polymer of butene-1, said copolymeric constituent containing from about 60 weight percent to about 99.95 weight percent of polymerized ethylene and from about 0.05 weight percent to about 40 weight percent of polymerized butene-1, based on the copolymeric constituent, and said copolymeric constituent having a density from about 0.90 to about 0.96 and a melt flow viscosity from about $1 \times 10^{-9}$ decigram per minute to about 1 decigram per minute by ASTM D-1238-62T(E).

2. The composition according to claim 1 wherein the block copolymer is a block copolymer of polyethylene and poly(butene-1).

3. The composition according to claim 1 wherein the copolymeric constituent comprises as the essential ingredient the block copolymer of polyethylene and an ethylene/butene-1 copolymer and, as a second ingredient, an ethylene/butene-1 copolymer.

4. The composition according to claim 1 wherein the polymeric blend comprises (1) from about 70 weight percent to about 80 weight percent of the high density, high molecular weight polyethylene and (2) from about 20 weight percent to about 30 weight percent of the copolymeric constituent containing from about 90 weight percent to about 99.75 weight percent of polymerized ethylene and from about 0.25 weight percent to about 10 weight percent of polymerized butene-1, but wherein butene-1 is present in concentrations up to 5 weight percent based on the total polymeric blend.

References Cited

UNITED STATES PATENTS 3,475,369   10/1969   Blunt _____ 260—878

FOREIGN PATENTS 644,141   7/1962   Canada _____ 260—897

SAMUEL H. BLECH, Primary Examiner

U.S. Cl. X.R.

117—124 E, 132 C, 138.8 A, 148; 260—41 R, 45.95, 94.9 B, 878 B

PO-1050
(5/69)

UNITED STATES PATENT OFFICE
CERTIFICATE OF CORRECTION

Patent No. __3,703,565__     Dated __November 21, 1972__

Inventor(s) __Louis D. Hoblit and Carl P. Strange__

It is certified that error appears in the above-identified patent and that said Letters Patent are hereby corrected as shown below:

Column 2, line 46, change "withdrawning" to --withdrawing--.

Column 3, line 36, delete the entire line consisting of "constituent containing as an essential ingredient a block".

Column 3, line 38, before "copolymer)", insert --"Polymer of butene-1"(as a block segment of the block--.

Signed and sealed this 10th day of April 1973.

(SEAL)
Attest:

EDWARD M. FLETCHER, JR.
Attesting Officer

ROBERT GOTTSCHALK
Commissioner of Patents